E. Q. MOSES.
VEHICLE WHEEL RIM.
APPLICATION FILED APR. 21, 1910.
1,139,702.
Patented May 18, 1915.
2 SHEETS—SHEET 1.
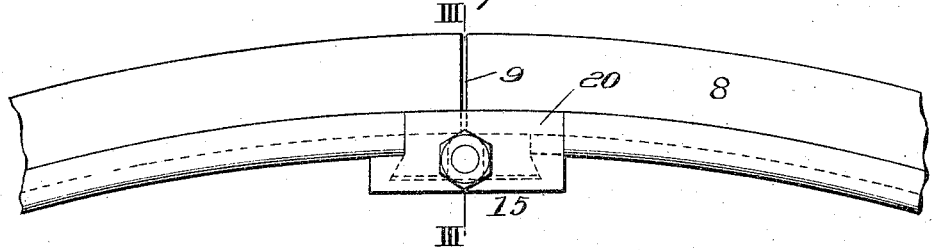
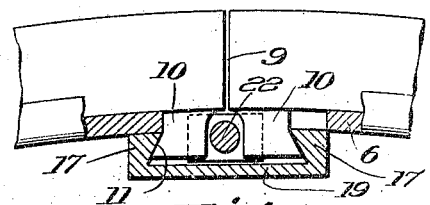
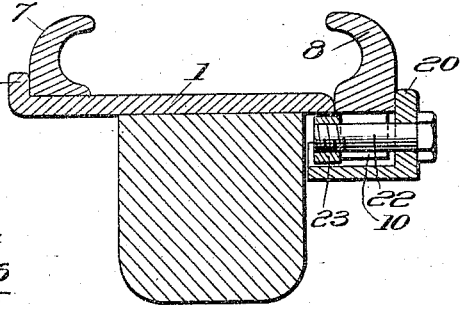
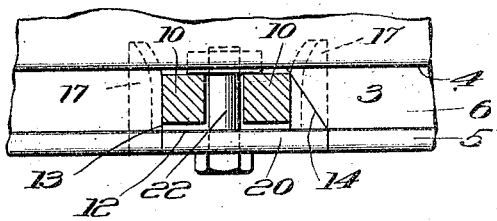
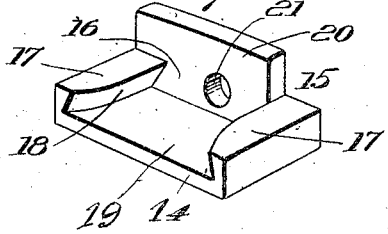
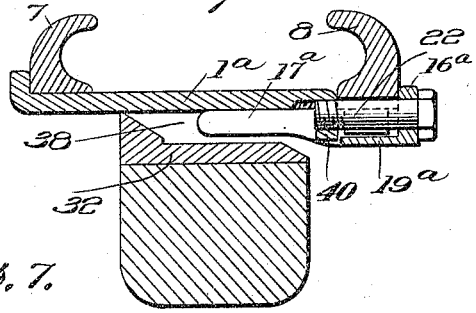
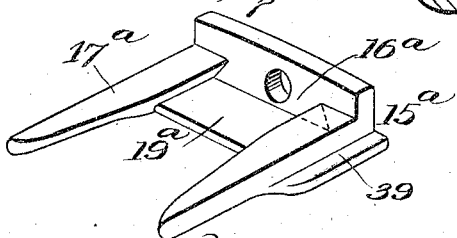
Witnesses:
Oliver Williams
Chas. D. Donohue
Edmund Quincy Moses  Inventor
By his Attorney
Seward Davis

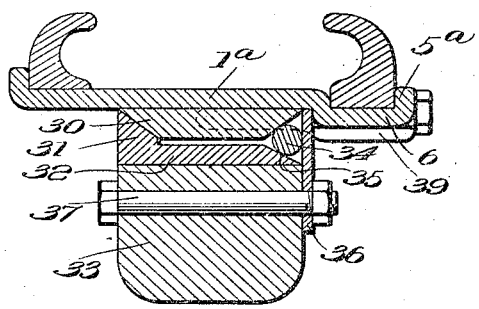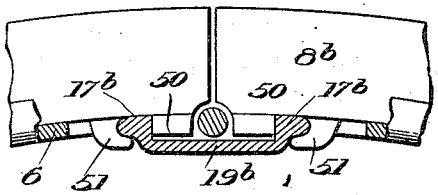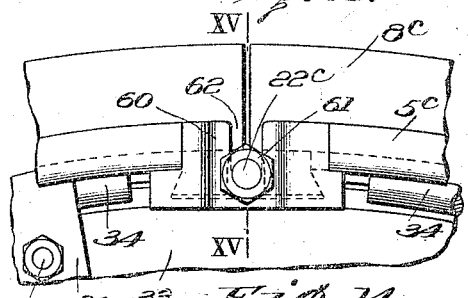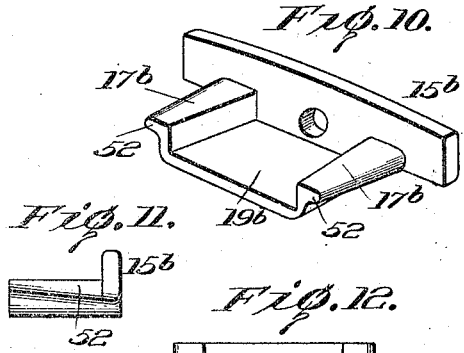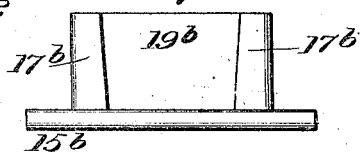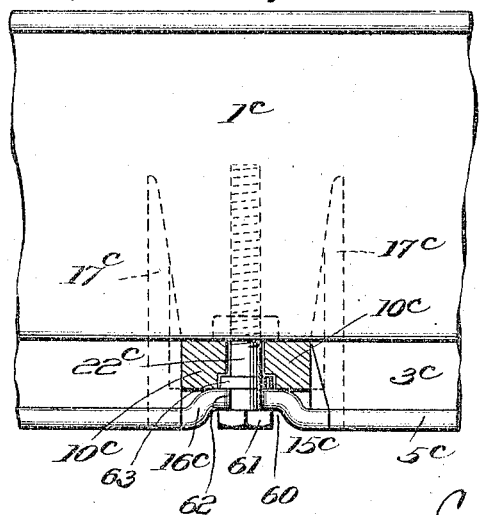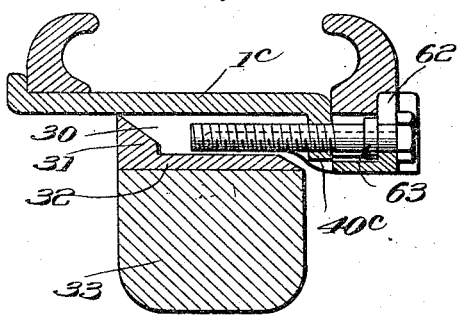

UNITED STATES PATENT OFFICE.

EDMUND QUINCY MOSES, OF NEW YORK, N. Y., ASSIGNOR, BY MESNE ASSIGNMENTS, TO THE B. F. GOODRICH COMPANY, A CORPORATION OF NEW YORK.

VEHICLE WHEEL-RIM.

1,139,702.         Specification of Letters Patent.     Patented May 18, 1915.

Application filed April 21, 1910. Serial No. 556,693.

*To all whom it may concern:*

Be it known that I, EDMUND QUINCY MOSES, a citizen of the United States, residing in the borough of Manhattan, city, county, and State of New York, have invented certain new and useful Improvements in Vehicle Wheel-Rims, of which the following is a specification.

This invention relates to improvements in rims for vehicle wheels designed for the purpose of holding pneumatic or other resilient tires, and particularly to that class of rims known in the trade as "quick-detachable" rims, the characteristic of which is that some portion of the rim is made removable or the rim is in some other way formed or adapted to facilitate the application to it or removal from it of the tire.

Certain forms of rims of this type now in common use are provided with a split removable flange, and my invention is designed primarily to provide an improved locking device for secured the ends of the split flange together and retaining the flange upon the main portion of the rim.

In the accompanying drawings, which form a part of this specification, Figure 1 is a side elevation of a portion of a rim illustrating one form of my invention; Fig. 2 is a view similar to Fig. 1, the locking device being shown in longitudinal section and parts of the rim flange being broken away; Fig. 3 is a section on line III—III of Fig. 1, the rim being shown as mounted upon a felly; Fig. 4 is a plan view of a portion of the rim shown in Fig. 1, the flange being cut away to show the lugs in section; Fig. 5 is a perspective view of the form of locking device illustrated in Figs. 1 to 4; Fig. 6 is a transverse section through a rim and felly showing a modified form of my locking device; Fig. 7 is a perspective view of the locking member illustrated in Fig. 6; Fig. 8 is a section of the rim shown in Fig. 6 taken at one side of the locking device; Fig. 9 is a side elevation partly in section of a portion of a rim showing another modified form of locking device; Figs. 10, 11 and 12 are, respectively, perspective end elevation and plan views of the locking member shown in Fig. 9; Fig. 13 is a side elevation of a portion of a rim illustrating another modification of my invention; Fig. 14 is a plan view of a portion of the rim shown in Fig. 13, the locking lugs being shown in section; and Fig. 15 is a transverse section on line XV—XV of Fig. 13, the rim being shown as removably mounted upon a felly.

Referring to the drawings in detail, and particularly to the form of my invention shown in Figs. 1 to 5, inclusive, the numeral 1 designates the main portion of the rim and is shown as provided at one edge with an up-turned flange 2, and at the other edge with a channel 3 having the side walls 4 and 5 and the bottom 6. An endless ring 7 seats against the flange 2 and forms one tire retaining flange, while the other tire retaining flange 8 is split, as indicated at 9, and has a base portion which seats in the channel 3. The ends of this split flange are provided with locking lugs 10, preferably being under-cut so as to leave projecting portions 11, thus giving them a sort of dove-tail shape. The rim is slotted or notched at 12 to receive the lugs 10, the slot preferably having one straight side 13 against which one of the lugs 10 is seated, and one inclined side 14 which serves to guide the other lug into position. This form of slot is not, however, essential. The locking device or member proper comprises the piece 15 having the back or body 16 from which project the prongs or wedges 17, under-cut at 18 to receive the propecting portions 11 of the lugs. The prongs or wedges 17 are preferably joined by the web or bottom 19 which prevents them from spreading, thus permitting them to resist any stress which may be applied to them, and which also serves to exclude dirt from the joint and to give the same a neat appearance. The back 16 preferably has an extension 20 which fills the space where a portion of the channel wall 5 has been cut away. The back is provided with a perforation 21 through which passes the bolt 22, the latter screwing into the nut 23. The nut seats against the lugs 10, and by screwing the bolt into it the locking piece may be drawn in, wedging the lugs 10 toward each other and drawing them down, thus drawing the ends of the split flange together and securing them to the rim. The prongs or wedge portions 17 flare outwardly, as indicated at 24, in order to permit them to engage readily with the lugs and draw the latter together as the wedge piece is forced in. The portions of the prongs or wedges nearest the back are preferably parallel, or nearly so, so that when the locking piece has reached its final position it will seat firmly against the lugs and will not be subject to a tendency to work off. The tops of the prongs or wedges 17 seat beneath the portions of the rim at each side of the slot 12.

In Figs. 6, 7 and 8 I have illustrated a modified form of my invention especially applicable to demountable rims. In a well-known form of rim of this type, the tire carrying portion of the rim $1^a$ has secured to its inner face a plurality of plates 30 with inclined faces, one of which engages with the inclined face of a flange 31 projecting from a band 32 permanently secured to the felly 33, while the other inclined face of the plate is engaged by a split locking ring 34 which seats upon an inclined face 35 formed upon the band 32. A series of keepers 36 bolted to the felly by bolts 37 retain the locking ring in position and tire carrying rim $1^a$ upon the wheel. The form of demountable rim just described is used merely as an illustration, as it is obvious that my invention is equally applicable to other demountable rims.

The locking member $15^a$ used with this form of my invention comprises the body or back $16^a$, from which project the elongated prongs or wedges $17^a$ joined by the web or bottom $19^a$ for but a portion of their length. The end portions of the prongs are sufficiently slender to be inserted in the space 38 between the tire carrying portion of the rim and the band 32, as indicated in Fig. 6. The prongs, owing to their length, have a considerable spread at their extremities in order to permit them to embrace the locking lugs, even though widely separated. The locking piece may thus be used to draw the ends of the split flange together as well as to lock them in that position, thus rendering unnecessary the use of a special tool such as has been required with previous forms of rims. The prongs $17^a$ seat directly beneath the main body of the rim $1^a$, as shown in Fig. 6, and not beneath the bottom 6 of the channel, as do the top faces of the prongs 17 of the locking piece 15 previously described. A very compact structure is thus obtained. The locking piece is, however, preferably provided with lateral extensions 39 which engage beneath the bottom of the channel at each side of the slot in the latter. The bolt 22 which retains the locking piece in position, instead of behind provided with a loose nut similar to the nut 23 previously described, screws into a threaded opening formed in a tongue 40 bent down from the body of the rim. If the space 38 were sufficiently deep, the bottom $19^a$ might, of course, be carried to the extremities of the prongs or wedges $17^a$, but this is unnecessary, as the forces tending to spread the prongs do not become very great until the locking piece is about to reach or reaches its final position. When that position is reached, those portions of the prongs or wedges which are joined by the web or bottom are in engagement with the lugs.

In Figs. 9, 10, 11 and 12 I have illustrated another modification of my invention in which the split flange $8^b$ is provided with two pairs of lugs formed for engagement with the locking piece. The inner pair of lugs 50 are similar to the lugs 10, except that they are shorter and are not under-cut, while the outer pair of lugs 51 are under-cut or hooked toward each other. The locking piece $15^b$ carries a pair of wedges $17^b$, preferably joined by the bottom or web $19^b$, the inner faces of the wedges being vertical to engage the straight outer faces of the lugs 50, and flaring so as to wedge the lugs toward each other, as in the forms of my invention previously described. As the lugs are not under-cut and are not drawn down by over-hanging portions of the wedges, the lugs may be made quite short, and the bottom $19^b$ may be brought very close to the bottom 6 of the rim channel, thus making a very compact structure. In order to retain the locking piece in position the wedges or prongs 17 of the latter are provided with the extensions 52 which engage with the hooked lugs 51.

Figs. 13, 14 and 15 illustrate a form of my invention in some respects similar to that shown in Figs. 6, 7 and 8. The rim $1^c$ of this modification is provided with plates 30 by which it is secured to the wheel band 32 mounted upon the felly 33, a locking ring 34 and keepers 36 being used, as in the form above described. The split flange $8^c$ is provided with the under-cut lugs $10^c$ engaged by the prongs or wedges $17^c$ of the locking piece $15^c$. The body or back $16^c$ of the locking piece is off-set inwardly, as indicated at 60, in order to provide a recess for reception of the head 61 of the bolt $22^c$. As thus constructed, no part of the rim projects laterally beyond the channel flange $5^c$, and there is no danger of shearing off the head of the bolt. The back of the locking piece is preferably provided with an open slot 62 for the reception of the bolt, instead of with a perforation, the bolt being made considerably longer than in the forms illustrated in the previous figures, and being provided with a collar 63 between which and the bolt-head the back of the locking piece is retained. The bolt screws through an opening in a projection $40^c$ formed upon the body of the rim, and owing to its length need never be entirely removed therefrom. When it is desired to remove the split flange, it is merely necessary to screw the bolt part way out, this operation, owing to the use of the collar 63, also drawing out the locking piece, when the latter can be dropped, to be free of the bolt-head, and removed. The flange can then be taken off, and, after a tire has been applied, replaced in the usual manner. The prongs of the locking piece are then inserted between the rim and band 32 and the body of the locking piece raised until engaged between the bolt-head and the collar 63. The bolt then being screwed up forces the locking piece into position, thus drawing the ends of the flange together and seating the same firmly in the channel 3ᶜ.

A valuable feature of my invention is that the retaining bolt is mounted parallel with the wheel axis and with the bolts 37, which retain the tire carrying rim upon the wheel. The bolt-head 61 is thus more easily accessible than if located under the rim, and may be turned by means of the socket wrench or brace now commonly used for operating the demountable rim retaining bolts. But one tool is, therefore, required for operating both sets of bolts, this being the only tool necessary for the complete operation of the rim.

It will be understood that owing to the shape of the wedge faces of the locking piece and of the corresponding faces of the lugs, it is possible to engage the locking piece with the lugs before the latter have been pushed entirely through their openings in the rim and before the ends of the split flange have been brought into contact with their seats on the rim. After the locking piece has been so engaged, its movement to its final operative position will cause it to draw or force the lugs and the ends of the split flange radially toward the center of the wheel and thus seat the ends of the flange upon the rim as well as to draw the ends of the flange together circumferentially. In rims provided with split flanges there is always a tendency for the ends of the flange to spring away from the rim, and with most locking devices heretofore used it has been impossible to secure an operative connection between the locking device and the ends of the flange until the latter have been seated firmly on the rim. It has accordingly been necessary to use a tool to force the ends of the flange into position so that the locking device could be applied. With my construction, this is unnecessary, as the locking device can be applied before the ends of the flange are fully in position and can itself be used to draw down the ends of the flange. Thus no special tool for this purpose is necessary.

Having thus set forth certain preferred embodiments of my invention, but without limiting myself to the exact constructions described and illustrated, I claim:

1. In a vehicle wheel rim, in combination, a tire-seating member, a split detachable flange mounted thereon, a locking piece comprising a pair of wedges and a connecting portion, for drawing the ends of said flange together, said locking piece being movable from inoperative to operative position in a plane approximately perpendicular to a radius of the rim drawn to the point where the flange is split, and means for positively securing said locking piece in operative position, said locking piece when secured in such position holding the ends of the flange drawn together.

2. In a vehicle wheel rim, in combination, a slotted tire seating member, a split detachable flange mounted on said member and having at its ends lugs projecting through the slotted portion of said member, a locking piece comprising a pair of wedges and a connecting portion engaging said lugs, and a bolt whose axis is substantially parallel to the tire seating surface of said rim for securing said locking piece in position.

3. In a vehicle wheel rim, in combination, a slotted tire seating member, a split tire retaining flange mounted on said member and provided with lugs projecting through the slotted portion of said member and a laterally applied locking piece for securing said lugs together, said locking piece comprising a plurality of lug engaging members connected by a web located beneath the ends of said lugs, said locking piece when in unlocking position being substantially parallel to the lateral face of the rim.

4. In a vehicle wheel rim, in combination, a slotted tire seating member, a split tire retaining flange mounted on said member and provided with lugs projecting through the slotted portion of said member, and a locking piece for engaging and drawing together said lugs, said locking piece comprising a back having projecting therefrom a pair of wedges, the wedging surfaces of which face each other and diverge toward their free ends, and a web passing under the ends of said lugs connecting said wedges, said locking piece when in unlocking position being substantially parallel to the lateral face of the rim.

5. In a vehicle wheel rim, in combination, a slotted tire seating member, a split tire retaining flange mounted upon said member and provided with lugs passing through the slotted portion of said member, and a locking piece for securing said lugs together, said locking piece comprising a back having projecting therefrom a pair of lug engaging members, and a bolt arranged substantially parallel with the tire seating surface of said rim for securing said locking piece in position, said bolt passing through an opening in the back of said locking piece and between said lugs.

6. In a vehicle wheel rim, in combination, a tire seating member, a split tire retaining flange mounted thereon, a laterally applied locking piece for securing the ends of said split flange together, and means for positively forcing said locking piece laterally with relation to said rim in a rectilinear path substantially perpendicular to the plane of the wheel.

7. In a vehicle wheel rim, in combination, a tire seating member, a split tire retaining flange mounted thereon, a laterally applied locking piece for securing the ends of said split flange together, and means for positively forcing said locking piece toward and away from said rim in a rectilinear path substantially perpendicular to the plane of the wheel.

8. A vehicle wheel comprising in combination a tire-seating member, a split tire-retaining flange mounted thereon and means for drawing the ends of said flange together, said means comprising a locking piece having wedging surfaces facing each other and diverging in planes substantially perpendicular to a radius of the wheel drawn to the point where the flange is split, said wedging surfaces engaging portions of said flange, and a device carried by the wheel for forcing said locking piece laterally in said planes in a direction substantially perpendicular to the plane of the wheel to cause converging portions of said wedging surfaces successively to engage the portions of said flange.

9. In a vehicle wheel rim, in combination, a slotted tire seating member, a split tire retaining flange mounted on said member and provided with lugs projecting through the slotted portion of said member, a locking piece having a back and wedges projecting therefrom, said wedges having facing wedging surfaces diverging toward their free ends, a lug projecting from said tire seating member having a threaded opening therethrough, and a bolt passing through said threaded opening and through an opening in the back of said locking piece, said bolt having a collar projecting therefrom adjacent to the inner face of said back, and a head engaging the outer face of said back.

10. In a vehicle wheel rim, in combination, a slotted tire-seating member, a split tire-retaining flange mounted on said member and having at each end thereof a lug projecting through an opening in said tire-seating member, each of said lugs being undercut to form an overhanging wedging face thereon, and a locking member having overhanging wedging faces engaging the overhanging wedging faces of said lugs, the wedging faces on said lugs and locking member being so shaped that when the locking member is moved from inoperative position the lugs will be moved toward the center of the wheel.

11. In a vehicle wheel rim, in combination, a slotted tire-seating member, a split tire-retaining flange mounted on said member and having at each end thereof a lug projecting through an opening in said tire-seating member, each of said lugs being undercut to form an overhanging wedging face thereon, and a locking member having overhanging wedging faces engaging the overhanging wedging faces of said lugs, the wedging faces on said lugs and locking member being so shaped that said faces may be brought into coöperative engagement before the ends of the flange carrying the lugs are seated upon said tire-carrying member, the movement of said locking member to final operative position with its wedging faces in engagement with the wedging faces of said lugs acting positively to force said lugs toward the center of the wheel.

12. A locking piece for securing a removable tire retaining flange to a vehicle wheel rim, comprising a back having projecting therefrom a pair of wedges and a web joining the lower portions of said wedges.

13. A locking piece for securing a removable tire retaining flange to a rim comprising a back having projecting therefrom a pair of wedges, the wedging surfaces of the latter facing each other and diverging toward their free ends, and a web connecting the portions of said wedges adjacent to said back.

14. A locking piece for securing a removable tire retaining flange to a vehicle wheel rim comprising a back having projecting therefrom a pair of wedges, the wedging surfaces of which face each other and diverge toward their free ends, said wedging surfaces being under-cut, and a web connecting said wedges.

15. A locking piece for securing a removable tire retaining flange to a vehicle wheel rim comprising a back having a transverse slot therethrough open at one side, and having projecting from one face thereof a pair of wedges, the wedging surfaces of which face each other and diverge toward their free ends, and a web joining portions of said wedges adjacent to said back, the extremities of said wedges being unconnected.

EDMUND QUINCY MOSES.

Witnesses:
SEWARD DAVIS,
ELIZABETH J. VAIL.

Copies of this patent may be obtained for five cents each, by addressing the "Commissioner of Patents, Washington, D. C."